US012807852B2

(12) United States Patent
Cao

(10) Patent No.: US 12,807,852 B2
(45) Date of Patent: Nov. 24, 2026

(54) SILYLATED ADHESIVE COMPOSITION WITH IMPROVED ADHESION ON METALLIC SUBSTRATES

(71) Applicant: BOSTIK SA, Colombes (FR)

(72) Inventor: Yichen Cao, Shanghai (CN)

(73) Assignee: BOSTIK SA, Puteaux (FR)

( * ) Notice: Subject to any disclaimer, the term of this patent is extended or adjusted under 35 U.S.C. 154(b) by 400 days.

(21) Appl. No.: 18/268,419

(22) PCT Filed: Dec. 13, 2021

(86) PCT No.: PCT/EP2021/085519

§ 371 (c)(1),
(2) Date: Jun. 20, 2023

(87) PCT Pub. No.: WO2022/144169

PCT Pub. Date: Jul. 7, 2022

(65) Prior Publication Data

US 2024/0034920 A1 Feb. 1, 2024

(30) Foreign Application Priority Data

Dec. 30, 2020 (EP) .................................... 20217917

(51) Int. Cl.

| | |
|---|---|
| ***B29C 65/48*** | (2006.01) |
| ***B32B 7/12*** | (2006.01) |
| ***B32B 15/04*** | (2006.01) |
| ***B32B 15/20*** | (2006.01) |
| ***B32B 37/12*** | (2006.01) |
| ***C08J 9/32*** | (2006.01) |
| ***C09J 5/08*** | (2006.01) |
| ***C09J 11/08*** | (2006.01) |
| ***C09J 123/26*** | (2006.01) |
| ***C09J 151/06*** | (2006.01) |
| ***C09J 201/10*** | (2006.01) |
| *B29K 105/16* | (2006.01) |

(52) U.S. Cl.

CPC ........... *C09J 151/06* (2013.01); *B29C 65/484* (2013.01); *B32B 7/12* (2013.01); *B32B 15/043* (2013.01); *B32B 15/20* (2013.01); *B32B 37/1284* (2013.01); *C08J 9/32* (2013.01); *C09J 5/08* (2013.01); *C09J 11/08* (2013.01); *C09J 123/26* (2013.01); *C09J 201/10* (2013.01); *B29K 2105/165* (2013.01); *B32B 2037/1261* (2013.01); *B32B 2255/06* (2013.01); *B32B 2255/26* (2013.01); *B32B 2311/24* (2013.01); *C08J 2203/22* (2013.01)

(58) Field of Classification Search

CPC .............. B29C 65/484; B29C 65/4865; B29C 65/4875; B29K 2105/048; B29K 2105/165; B32B 7/12; B32B 15/04; B32B 15/043; B32B 15/20; B32B 37/1284; B32B 2037/1261; B32B 2311/24; C08F 230/085; C08F 255/02; C08J 9/32; C08J 2203/22; C08K 7/22; C08L 51/06; C08L 2205/20; C08L 2312/08; C09J 5/08; C09J 11/08; C09J 123/26; C09J 151/06; C09J 201/10

See application file for complete search history.

(56) References Cited

U.S. PATENT DOCUMENTS

| | | | | |
|---|---|---|---|---|
| 5,994,474 | A * | 11/1999 | Wey | C09J 151/06 525/383 |
| 6,225,361 | B1 * | 5/2001 | Nakajima | B01J 13/22 428/407 |
| 2005/0043455 | A1 * | 2/2005 | Hohner | C08F 255/00 524/487 |
| 2007/0155859 | A1 * | 7/2007 | Song | C08G 18/10 523/218 |
| 2016/0326408 | A1 * | 11/2016 | Suen | C08L 51/06 |
| 2017/0218131 | A1 * | 8/2017 | Son | C08F 4/34 |
| 2019/0211239 | A1 | 7/2019 | Lee et al. | |

FOREIGN PATENT DOCUMENTS

| | | | |
|---|---|---|---|
| DE | 102007023982 | A1 | 11/2008 |
| EP | 3287276 | A1 | 2/2018 |
| JP | 2001098079 | A | 4/2001 |
| JP | 2007084805 | A | 4/2007 |
| JP | 2010166032 | A | 7/2010 |
| JP | 2011001464 | A | 1/2011 |
| JP | 2011231215 | A | 11/2011 |
| JP | 2019534914 | A | 12/2019 |
| WO | 2019109328 | A1 | 6/2019 |

OTHER PUBLICATIONS

ISA/EP; International Search Report and Written Opinion for International Patent Application No. PCT/ep2021/085519 dated Apr. 19, 2022, 8 pages.

* cited by examiner

*Primary Examiner* — Michael A Tolin
(74) *Attorney, Agent, or Firm* — Rimon P.C.; Allyn B. Elliott

(57) ABSTRACT

A moisture curable silylated adhesive composition comprises from 20% to 50% weight of a silane modified APAO; from 2% to 15% weight of a filler consisting of expanded hollow thermoplastic polymer microspheres; and from 10% to 60% weight of a tackifying agent. A method for manufacturing an assembly product comprises heating the moisture curable silylated adhesive composition from 130° C. to 180° C. to make it liquid enough to be applied on a substrate, then coating the composition on a surface of a primary substrate, then putting into contact the coated surface of the primary substrate with a surface of a secondary substrate, then chemically curing the composition with water, preferably with atmospheric moisture.

13 Claims, No Drawings

SILYLATED ADHESIVE COMPOSITION WITH IMPROVED ADHESION ON METALLIC SUBSTRATES

CROSS-REFERENCE TO RELATED APPLICATIONS

This application is a U.S. National Stage application of International Patent Application No. PCT/EP2021/085519, filed on Dec. 13, 2021, which claims the benefit of European Patent Application No. 20217917.2, filed on Dec. 30, 2020.

TECHNICAL FIELD

The present invention relates to a moisture curable polyolefin hot-melt adhesive composition having an improved adhesion on metallic substrates and to its use for assembling substrates including metallic substrates, preferably aluminium substrates.

STATE OF THE ART

Hot-melt adhesives are solvent free adhesives, which are solid at room temperature and which are applied to the substrate to be bonded in the form of a melt. After cooling, the adhesive solidifies and forms an adhesive bond with the substrate, through physically occurring bonding. Conventional hot-melt adhesives are non-reactive adhesives, which soften again upon heating and are, therefore, not suitable to be used at elevated temperatures. Hot-melt adhesives are generally provided in the form of compositions, which comprise a thermoplastic polymer and optionally a tackifying resin and a plasticizer.

Reactive hot-melt adhesives contain polymers with reactive groups that enable chemical curing of the adhesive, for example, by crosslinking of the polymer chains into a three dimensional solid network. Due to this cured network, the reactive hot-melts do not soften upon heating and these adhesives are, therefore, also suitable for use at elevated temperatures.

The chemical curing of the polymers can be initiated, for example, by heating or exposing the composition to water. Moisture curing hot-melt adhesives typically contain polymers functionalized with isocyanate or silane groups, which enable the crosslinking of the polymer chains upon contact with water, in particular with atmospheric moisture or moisture present on the surfaces of the substrates due to be assembled.

Typical moisture curing hot-melt adhesives, which are used as assembly adhesives in the transportation industry, in particular in the automotive industry, include polyurethane based and polyolefin based hot melt adhesives.

Reactive hot-melt polyurethane (HMPUR) adhesives consist mainly of isocyanate-terminated polyurethane prepolymers, which have been obtained by reacting suitable polyols, typically diols, with a stoichiometric excess of polyisocyanates, typically diisocyanates. When contacted with water, the residual isocyanate groups of the polyurethane prepolymers form carbamic acid, which is unstable and decomposes into an amine and carbon dioxide. The amine reacts rapidly with other isocyanate groups to form urea linkages.

State-of-the-art HMPUR adhesives have certain disadvantages. One disadvantage is the residual monomer content of polyisocyanates, particularly the more volatile diisocyanates. Some HMPUR adhesive compositions may contain significant amounts of unreacted monomeric diisocyanates. At the hot-melt application temperature (typically at 100° C. to 170° C.), monomeric diisocyanates have a considerable vapor pressure and may be partly expelled in gaseous form. The isocyanate vapor is toxic, irritating and has a sensitizing effect, so that precautionary measures have to be taken in the application process. Another disadvantage of state-of-the art HMPUR adhesives derives from the fact that, due to their poor adhesion on non-polar substrates such as polypropylene and polyethylene, they require, when they must be applied for bonding such non-polar substrates, a pretreatment of the corresponding substrates surfaces with a primer. Such a pretreatment significantly increases the total application costs.

Reactive hot-melt polyolefin adhesives (HMPOR), especially the ones based on silane modified amorphous poly-α-olefins (or "Amorphous Poly Alpha Olefins" abbreviated in APAO), have been developed to replace HMPUR adhesive compositions. Due to their high non-polar properties, they are in principle suitable for bonding non-polar substrates such as polypropylene and polyethylene and the corresponding composites, without pre-treatment of the substrates surfaces with a primer. Further, since there is no isocyanate, there are no concerns about emission of isocyanate monomer vapor.

Reactive polyolefin hot-melt adhesives based on silane modified poly-α-olefins are disclosed, for example, in U.S. Pat. Nos. 5,994,474 and 8,865,822. When contacted with water, the silane groups of the polyolefin polymers, such as methoxysilane groups, react with water to form silanols, which subsequently undergo reaction with other silanol groups to form covalent siloxane bonds between individual polymer molecules, as part of a condensation reaction.

In the automotive industry, HMPOR are widely used for the production of headliners, armrest or door panel lamination. However, due to their relatively poor adhesion on polar substrates, they are difficult to implement for the bonding of polar substrates, such as PMMA or metals like aluminium. Now, with the increased development of cars headliners such as ceiling skylight, metallic and especially aluminium frames are more and more commonly used, for example as a support to skylight window systems. For these kinds of use, current reactive HMPOR, could not be implemented due to lack of adhesion to aluminium.

PCT application WO 2019/048593 from SIKA describes an adhesive composition comprising one thermoplastic, silane group containing, poly-α-olefin and the reaction product of a monoisocyanate with a silane containing one isocyanate reactive group selected among a hydroxyl group, a mercapto group and an amino group. However, the adhesion on aluminium of such a composition is noted as poor.

PCT application WO 2019/109328 from HENKEL describes a moisture curable hot-melt adhesive composition which comprises in addition to a silane modified polymer and a tackifying agent an ethylenically unsaturated carboxylic acid graft modified polymer. This application does not point to adhesion to metallic substrates and in particular to aluminium.

There remains therefore a need for a silane modified APAO based adhesive composition which has an improved adhesion to metallic substrates, preferably to aluminium substrates.

DETAILED DESCRIPTION OF THE INVENTION

The present invention relates to a moisture curable silylated adhesive composition comprising, based on the total weight of said composition:

from 20% to 50% weight of at least one silane modified amorphous poly-α-olefin (or APAO) (A);

from 2% to 15% weight of at least one filler (B) consisting of expanded hollow thermoplastic polymer microspheres; and from 10% to 60% weight of at least one tackifying agent (C).

Unless otherwise indicated, the percentages used in the present text for expressing quantities of the ingredients of the composition according to the invention correspond to weight/weight percentages.

It has been found that the moisture curable silylated adhesive composition such as previously defined unexpectedly results, after curing with moisture, into a cured composition which advantageously also possesses a high level of adhesion to metallic substrates, and in particular to aluminium substrates.

Such a high level of adhesion can be experimentally inferred from the failure mode of an assembly consisting of 2 aluminium plates joined, on a bonding area, by said cured composition, in tests in which the adhesive joint present on the bonding area of the assembly, is submitted to shear stress. Indeed, in the field of adhesives, several types of failure in tensile and/or shear tests may be distinguished:

Cohesive Failure, which occurs within the actual layer of the adhesive joint, each of the two substrates bonding areas bearing a fraction of the adhesive (often noted as 100% CF);

Adhesive Failure, which occurs at the adhesive/substrate interface and results into no adhesive remaining on one of the two substrates bonding areas (often noted as 100% AF).

There are also many intermediate situations, corresponding to a mixture of the two failure modes which are assessed by calculating portions of cohesive and adhesive failure areas.

Now, it has been found that the above mentioned two aluminium plates assembly advantageously shows a 100% Cohesive Failure or at least a 50% CF, in shear trials.

In addition to its high adhesion quality to aluminium substrates, the corresponding adhesive joint also exhibits advantageous cohesive properties, which may be observed through measurement of the stress corresponding to the failure (or breaking or rupture) of the two aluminium plates assembly mentioned above.

The moisture curable silylated adhesive composition according to the invention is therefore well suited to a use aiming at assembling metallic substrates, more preferably aluminium substrates.

Silane Modified Amorphous Poly-α-Olefin (A)

The moisture curable silylated adhesive composition according to the invention comprises at least one silane modified amorphous poly-α-olefin (A).

The term "α-olefin" designates an alkene of formula $C_nH_{2n}$ (n corresponding to the number of carbon atoms), which has a carbon-carbon double bond at the first carbon atom (α-carbon). Examples of α-olefins include ethylene, propylene, 1-butene, 2-methyl-1-propene (isobutylene), 1-pentene, 1-hexene, 1-heptene and 1-octene.

The term "poly-α-olefin" designates homopolymers and copolymers obtained by polymerization or oligomerization of one or more α-olefins.

Particularly useful silane modified poly-α-olefins are either completely amorphous or have a low level of crystallinity. In one embodiment, the degree of crystallinity is no greater than about 25% as determined by X-ray diffraction.

According to a preferred embodiment, the silane modified amorphous poly-α-olefin (A) comprises at least one, preferably at least two, alkoxysilyl groups of formula (I):

$$—Si(R^1)_p(OR^2)_{3-p} \quad (I)$$

in which:

R[1] represents a linear or branched alkyl radical comprising from 1 to 4 carbon atoms, with the possibility that when there are several radicals $R^1$, these radicals are identical or different;

$R^2$ represents a linear or branched alkyl radical comprising from 1 to 4 carbon atoms, with the possibility that when there are several radicals $R^2$, these radicals are identical or different, with the possibility that two groups $OR^2$ may be engaged in the same ring;

p is an integer equal to 0, 1 or 2, preferably equal to 0 or 1.

Such alkoxysilyl groups containing poly-α-olefins are known to a person skilled in the art and they can be produced, for example, by grafting unsaturated silanes, such as vinyl-trimethoxysilane, into poly-α-olefins which have been obtained by Ziegler-Natta catalyzed polymerization or by metallocene catalyzed polymerization.

Suitable alkoxysilyl groups containing poly-α-olefins include silane grafted homopolymers, copolymers, and terpolymers of monomers selected from the group consisting of ethylene, propylene, 1-butene and higher α-olefins. Particularly suitable alkoxysilyl groups containing poly-α-olefins include silane grafted homopolymers of propylene, silane grafted copolymers of propylene and ethylene, silane grafted copolymers of propylene and 1-butene or other higher α-olefins, and silane grafted terpolymers of ethylene, propylene, and 1-butene. Preferably, the at least one alkoxysilyl group containing poly-α-olefin is a silane grafted atactic poly-α-olefin, in particular a silane grafted amorphous poly-α-olefin (APAO).

Amorphous poly-α-olefins are commercially available. For example, amorphous poly-α-olefins based on ethylene, propylene and 1-butene can be obtained from the VESTOPLAST® range of products of EVONIK, which includes a silane modified amorphous poly-α-olefin grade called VESTOPLAST® 206.

Filler (B)

The moisture curable silylated adhesive composition according to the invention comprises at least one filler (B) consisting of expanded hollow thermoplastic polymer microspheres.

Expandable thermoplastic polymer microspheres comprise a thermoplastic polymer shell and a blowing agent entrapped therein. When such expandable microspheres are heated at a temperature high enough to induce a sufficient degree of expansion for a certain length of time, expanded hollow thermoplastic polymer microspheres are obtained.

According to a preferred embodiment, filler (B) consists of expanded hollow thermoplastic polymer microspheres coated with a colloidal calcium carbonate. Such microspheres are known and are disclosed in U.S. Pat. No. 6,225,361. The expanded thermoplastic polymer microspheres are admixed with colloidal calcium carbonate, in order to provide composite beads having a hollow expanded thermoplastic polymer microsphere shell and, as deposited on its surface, colloidal calcium carbonate.

Such a filler is also commercially available, as a dry free flowing product, for instance from Japan Fillite Co. Ltd under the name EMC Organic-inorganic hybrid filler.

Tackifying Agent (C)

The moisture curable silylated adhesive composition according to the invention comprises at least one tackifying agent (C).

The tackifying resin (C) is preferably selected among the following categories:

(a) natural and modified rosins such as, for example, gum rosins, wood rosins, tall-oil rosins, distilled rosins, hydrogenated rosins, dimerized rosins and polymerized rosins;

(b) glycerol and pentaerythritol esters of natural and modified rosins, such as, for example, the glycerol esters of pale wood rosin, the glycerol esters of hydrogenated rosin, the glycerol esters of polymerized rosin, the pentaerythritol esters of pale wood rosin, the pentaerythritol esters of hydrogenated rosin, the pentaerythritol esters of tall oil rosin and the phenolic modified pentaerythritol esters of rosin;

(c) polyterpene resins include hydrogenated polyterpene resins having a Ring and Ball softening point of from about 20° C. to 140° C., the latter polyterpene resins generally resulting from the polymerization of terpene hydrocarbons, such as the monoterpene known as pinene, in the presence of Friedel-Crafts catalysts at moderately low temperatures;

(d) phenolic-modified terpene resins such as, for example, those resulting from the condensation, in an acidic medium, of a terpene and a phenol;

(e) aliphatic (including cycloaliphatic) petroleum hydrocarbon resins (C5) having a Ring and Ball softening point of from about 60° C. to 140° C., said resins resulting from the polymerization of C5-hydrocarbon monomers; and the corresponding hydrogenated derivatives resulting from a subsequent total or partial hydrogenation thereof;

(f) aromatic petroleum hydrocarbons resins (C9) having Ring and Ball softening point of from about 60° C. to 140° C., said resins resulting from the polymerization of C9-hydrocarbon monomers; and the corresponding hydrogenated derivatives resulting from a subsequent total or partial hydrogenation thereof;

(g) aliphatic (including cycloaliphatic) and/or aromatic petroleum resins (C5/C9) having a Ring and Ball softening point of from about 60° C. to 140° C., said resins resulting from the polymerization of C5/C9-hydrocarbon monomers; and the corresponding hydrogenated derivatives resulting from a subsequent total or partial hydrogenation thereof;

(h) silanized derivatives of C5 resins, C9 resins and mixture of C5/C9 resins, such as defined by the above classes (e), (f) and (g), by thermal polymerization of a composition including silanes and monomers, including cyclic olefins having at least one ethylenically unsaturated group selected from among C5 fractions, C9 fractions, and dicyclopentadiene of naphtha cracking. Such silanized derivatives are for instance disclosed by the patent application EP 3176191.

According to a more preferred embodiment, tackifying resin (C) is selected among the silanized derivatives of category (h).

As example of C5-hydrocarbon monomers useful to prepare the tackifying resins belonging to class (e) or (g), mention may be made of trans-1,3-pentadiene, cis-1,3-pentadiene, 2-methyl-2-butene, dicyclopentadiene, cyclopentadiene, cyclopentene, and any mixture thereof.

As example of C9-hydrocarbon monomers useful to prepare the tackifying resins belonging to class (f) or (g), mention may be made of vinyltoluenes, dicyclopentadiene, indene, methylstyrene, styrene, methylindenes, and any mixture thereof.

According to a particular embodiment of the invention, a mixture of two or more of the above described tackifying resins is used in the hot melt adhesive composition according to the invention.

The tackifying resin(s) (C) used according to the invention are commercially available.

As example of commercially available tackifying resin(s) (C) belonging to class (a), mention may be made of:

- unmodified natural tall oil rosins from KRATON Company sold under the trade names SYLVAROS® (85, 90 and NCY),
- the partially hydrogenated rosin from EASTMAN Company sold under the trade name FORALYN® E and the fully hydrogenated rosin from Eastman sold under the trade name FORAL® AX-E,
- the dimerized rosin from EASTMAN Company sold under the trade name DYMEREX®.

As example of commercially available tackifying resin(s) (C) belonging to class (b), mention may be made of:

- SYLVALITE® RE 100L, a pentaerythritol based tall-oil rosin ester, and
- SYLVALITE® RE 85L, a glycerol ester of tall oil rosin, both available from KRATON Company.

As example of commercially available tackifying resin(s) (C) belonging to class (c), mention may be made of:

- the polyterpene tackifiers from KRATON Company sold under the trade names SYLVAGUM® TR and SYLVARES® TR series (7115, 7125, A25L, B115, M1115).

As example of commercially available tackifying resin(s) (C) belonging to class (d), mention may be made of:

- the terpene phenol resins from KRATON Company sold under the trade names SYLVARES® TP (96, 2040, 300, 7042, 2019).

As example of commercially available tackifying resin(s) (C) belonging to class (e), mention may be made of:

- the aliphatic and cycloaliphatic petroleum hydrocarbon resins based on a C5-petroleum hydrocarbon fraction (such as a mixture of trans-1,3-pentadiene, cis-1,3-pentadiene, 2-methyl-2-butene, dicyclopentadiene, cyclopentadiene, cyclopentene), having a Ring and Ball softening point ranging from 60° C. to 140° C., from EASTMAN Company sold under the trade names WINGTACK® 98, WINGTACK® ET and from EXXONMOBIL sold under the trade name ESCOREZ® 1310LC,
- the partially aliphatic and cycloaliphatic petroleum hydrocarbon resins based on a C5-petroleum hydrocarbon fraction (such as a mixture of trans-1,3-pentadiene, cis-1,3-pentadiene, 2-methyl-2-butene, dicyclopentadiene, cyclopentadiene, cyclopentene), having a Ring and Ball softening point ranging from 80° C. to 140° C., from KOLON Company sold under the trade names SUKOREZ® SU210 and SUKOREZ® 230. The softening point of SUKOREZ® SU210 is 110° C.
- the fully hydrogenated cycloaliphatic petroleum hydrocarbon resins based on a dicyclopentadiene-petroleum hydrocarbon fraction, having a Ring and Ball softening point ranging from 60° C. to 140° C., from EXXONMOBIL sold under the tradename ESCOREZ® 5400 series (5400, 5415, 5490). The softening point of ESCOREZ® 5400 is 100° C.

As example of commercially available tackifying resin(s) (C) belonging to class (f), mention may be made of:

the aromatic petroleum hydrocarbon resins based on a C9-hydrocarbon petroleum fraction (such as a mixture of vinyltoluenes, dicyclopentadiene, indene, methylstyrene, styrene, methylindenes), having a Ring and Ball softening point of from about 60° C. to 140° C., available from KOLON INDUSTRIES sold under the trade names HIKOTACK® (P-90, P110 S and P120 S).

As example of commercially available tackifying resin(s) (C) belonging to class (g), mention may be made of:

the partially hydrogenated cycloaliphatic modified aromatic petroleum hydrocarbon resins based on C5/C9-hydrocarbon petroleum fractions, having a Ring and Ball softening point of from about 60° C. to 140° C., from EXXONMOBIL Company sold under the tradename ESCOREZ® 5600 series (5600, 5615, 5690). The softening point of ESCOREZ® 5600 is 100° C.

the non hydrogenated aliphatic modified aromatic hydrocarbon petroleum resin based on C5/C9-hydrocarbon petroleum fractions sold by ZEON under the trade name QUINTONE® DX390N, with a softening point of 93° C.

As example of commercially available tackifying resin(s) (C) belonging to class (h), mention may be made of the silanized resin(s) available from KOLON INDUSTRIES sold under the trade names HRR® (100, A100 and 120).

HRR®-100 and HRR®-A100 have a Ring and Ball softening point of 100° C. HRR®-120 has a Ring and Ball softening point of 120° C.

According to a preferred embodiment, the Ring and Ball (or softening point) of the tackifying resin(s) (C) preferably lies in the range from 90° C. to 125° C., and even more preferably in the range from 90° C. to 115° C.

The softening temperature (or point) is determined in accordance with the standardized ASTM E 28 test, the principle of which is as follows. A brass ring about 2 cm in diameter is filled with the resin to be tested in the melt state. After cooling to room temperature, the ring and the solid resin are placed horizontally in a thermostatted glycerol bath, the temperature of which may vary by 5° C. per minute. A steel ball about 9.5 mm in diameter is centered on the solid resin disk. The softening temperature is, during the rise in temperature of the bath at a rate of 5° C. per minute, the temperature at which the resin disk flows by an amount of 25.4 mm under the weight of the ball.

According to a particularly preferred embodiment, the moisture curable silylated adhesive composition according to the invention comprises, based on the total weight of said composition:

from 30% to 40% weight of the at least one silane modified APAO (A);

from 3% to 10% weight of the at least one filler (B); and from 20% to 40% weight of the at least one tackifying agent (C).

Optional Ingredients

The moisture curable silylated adhesive composition according to the invention may comprise, in addition to the silane modified APAO (A), at least one additional thermoplastic polymer (D) which does not contain any alkoxysilyl group.

Preferably such polymer (D) is selected among styrene block copolymers (SBC).

Styrene block copolymer(s) useful according to the invention include linear or radial block copolymers comprising at least one non elastomeric block A being a polystyrene block and at least one elastomeric block B being a totally or partially hydrogenated or a non hydrogenated diene polymer block.

In particular, styrene block copolymer according to the invention may be chosen from the following copolymers, and mixtures thereof:

linear diblock copolymer of AB structure, linear triblock copolymer of ABA structure, radial block copolymers of the (AB)nY structure;

wherein:

A is a non elastomeric polystyrene block,

B is an elastomeric diene block polymer such as polybutadiene or polyisoprene block, Y is a multivalent compound, and n is an integer of at least 3.

The linear triblock copolymer of ABA structure may be used alone or in mixture with a linear diblock copolymer of AB structure.

The elastomeric block B can be post treated through partial or total hydrogenation to improve its heat stability.

Preferably, the styrene block copolymer useful according the invention is chosen from the following linear triblock copolymers:

styrene-butadiene-styrene copolymer (SBS) with or without styrene-butadiene diblock (SB), styrene-isoprene-styrene copolymer (SIS) with or without styrene-isoprene diblock (SI), styrene-ethylene-butylene-styrene copolymer (SEBS), styrene-butadiene-butylene-styrene copolymer (SBBS), styrene-ethylene-propylene-styrene copolymer (SEPS), and any mixture thereof.

More preferably, the styrene block copolymer is a linear triblock copolymer of ABA structure, as defined above, and, according to an even more preferred embodiment, a linear SEBS triblock copolymer.

When the styrene block copolymer is a mixture of linear triblock copolymer of ABA structure and linear diblock copolymer of AB structure, as defined above, the linear diblock content preferably ranges from 1 to 70% by weight relative to the total weight of the triblock and diblock mixture.

The amount of the end blocks A in the linear triblock copolymer of ABA structure, as defined above, may range from 14 to 51% by weight, preferably from 20 to 40% by weight, relative to the total weight of the linear triblock copolymer of ABA structure or, in the case of a mixture of linear triblock and diblock copolymers of ABA and AB structures, relative to the total weight of the triblock and diblock mixture.

Useful commercial styrene block copolymers include KRATON D and G® series from KRATON POLYMERS, EUROPRENE Sol T® series from VERSALIS (ENI group), SOLPRENE® series from DYNASOL ELASTOMERS, and TAIPOL® and VECTOR® series from TSRC Corporation.

As examples of useful specific styrene block copolymers, mention may be made of:

KRATON® G1643V which is a clear, linear triblock copolymer based on styrene and ethylene/butylene with a polystyrene content of 20%, an average molecular weight of around 110 000 g/mol, a MFI (measured according to ASTM D1238) of 19 grams (g)/10 minutes (mn) at 230° C. under a load of 2.16 kilograms (kg), and a SEB diblock content of around 7% by weight, relative to the total weight of the mixture.

KRATON® D1152 ES, a mixture of linear SBS triblock and SB diblock copolymers, with a styrene content of 29.5% by weight relative to the total weight of the mixture, an average molecular weight of around 122,000 g/mol, a MFI (measured according to ISO1133) of 8.5 grams (g)/10 minutes (mn) at 200° C. under a load of 5 kilograms (kg), and a SB diblock content of around 17% by weight relative to the total weight of the mixture.

KRATON® D1161, a mixture of linear SIS triblock and SI diblock copolymers, with a styrene content of 15% by weight relative to the total weight of the mixture, a MFI (measured according to ISO1133) of 9 g/10 mn at 200° C. under a load of 5 kg, an average molecular weight of around 220,000 g/mol, and a SI diblock content of around 19% by weight relative to the total weight of the mixture.

TAIPOL® SBS 4202 from TSRC Corporation, a linear SBS triblock copolymer with a styrene content of 40% by weight relative to the total weight of the triblock copolymer, a SB diblock content of less than 1%, a MFI (measured according to ASTM D1238) of 3-10 g/10 mn at 190° C. under a load of 5 kg, an average molecular weight of around 102,400 g/mol.

VECTOR® 4411 from TSRC Corporation, a linear SIS triblock copolymer with a styrene content of 44% by weight relative to the total weight of the triblock copolymer, a SI diblock content of less than 1%, a MFI (measured according to ASTM D1238) of 40 g/10 mn at 200° C. under a load of 5 kg, an average molecular weight of around 106,000 g/mol.

Preferably, the styrene block copolymer (D) is present in the composition according to the invention in an amount in the range from 4% weight to 16% weight, more preferably from 8% to 12%, based on the total weight of said composition.

The moisture curable silylated adhesive composition according to the invention may also optionally comprise at least one silane functionalized polyolefin wax (E). Suitable silane functionalized polyolefin waxes are produced by grafting silanes to polyolefin waxes. Preferred silane functionalized polyolefin waxes include waxes of ethylene and propylene homo- or copolymers grafted with silane, in particular, a polypropylene or polyethylene waxes grafted with silane.

Such silane functionalized waxes are available commercially, for instance from Clariant under the name Licocene® PP SI 1362 which is a silane modified polypropylene wax.

The amount of the at least one silane functionalized polyolefin wax in the adhesive composition is not particularly restricted. The at least one silane functionalized polyolefin wax may be present in the adhesive composition in an amount of at least 1.0 weight %, in particular at least 2.5 weight %, based on the total weight of the adhesive composition. Preferably, the at least one silane functionalized polyolefin wax is present in the adhesive composition in an amount of 1.0-30.0 weight %, preferably 2.5-20.0 weight %, more preferably 8.0-17.0 weight %, based on the total weight of the adhesive composition.

The moisture curable silylated adhesive composition according to the invention may also optionally comprise at least one plasticizer (F) which may be selected from a naphthenic oil, a paraffinic oil, a vegetable oil, polyisobutylene, a benzoate ester, a non silane functionalized wax and an acrylic or carboxylic acid modified wax.

The plasticizer(s) (F) may confer good processability to the hot melt adhesive composition. Moreover, the plasticizer(s) (F) may also provide desired viscosity control without substantially decreasing the adhesive strength or the service temperature (temperature of use) of the hot melt adhesive.

Naphthenic oils and paraffinic oils are petroleum based oils which consists in a mixture of naphthenic hydrocarbons (aliphatic, saturated or unsaturated, C4 to C7-member hydrocarbon rings, and preferably aliphatic, saturated or unsaturated, C4 to C6-member rings. As way of example, mention may be made of cycloalkanes such as cyclopentane, cyclohexane, cycloheptane)), paraffinic hydrocarbons (saturated, linear or branched, alkanes) and aromatic hydrocarbons (aromatic hydrocarbon rings, which may be monocyclic or polycyclic, and preferably aromatic C6-member hydrocarbon rings).

The classification of Naphthenic and Paraffinic oil is made based on the amount of each type of hydrocarbons in the oil. Typically, paraffinic oils have a paraffinic hydrocarbons content of at least 50% by weight; naphthenic oils have a naphthenic hydrocarbons content between 30% and 40% by weight, relative to the total weight of the plasticizer.

Preferably the plasticizer(s) (F) comprised in the composition according to the invention is a vegetable oil, preferably an epoxidized vegetable oil, most preferably an epoxidized linseed oil.

Useful plasticizers (F) are commercially available. By way of example, mention may be made of:

the naphtenic oils from NYNAS sold under the trade names NYFLEX® 223 and NYFLEX® 222B;

the epoxidized linseed oil from ARKEMA under the trade name VIKOFLEX® 7190;

Preferably, the plasticizer (F) is present in the composition according to the invention in an amount in the range from 1% weight to 20% weight, preferably from 4% to 10%, based on the total weight of said composition.

The moisture curable silylated adhesive composition according to the invention may also optionally comprise at least one moisture scavenger and/or one adhesion promoter.

It is preferable to monitor the moisture content of the composition according to the invention, so as to prevent immediate crosslinking of the silane modified amorphous poly-α-olefin (A), resulting in an increase in the viscosity of the adhesive composition during its storage. The moisture can be introduced into the composition by some of its ingredients.

For this reason, the composition according to the invention can comprise one or more dehydrating agents (or moisture scavengers). Appropriate dehydrating agents are in particular alkoxysilanes, such as trialkoxysilanes (in particular trimethoxysilanes) and alkoxysilanes comprising an amino, mercapto, epoxy or isocyanurate group. It is possible to give, as examples thereof, vinyltrimethoxysilane (or VTMO), γ-glycidyloxypropyltrimethoxysilane, N-(β-aminoethyl)-γ-aminopropyltrimethoxysilane, aminopropyltrimethoxysilane or trimethoxymethylsilane.

Some of these compounds can also act as adhesion promoters, in particular the trialkoxysilanes comprising an amino, mercapto, epoxy or isocyanurate group, such as the [3-(2-aminoethyl)aminopropyl]trimethoxysilane (also designated as DAMO) or the tris(3-trimethoxysilylpropyl) isocyanurate.

Many moisture scavengers and adhesion promoters are commercially available. For instance the tris(3-trimethoxysilylpropyl) isocyanurate is available from EVONIK under the name Dynasylan® 7163.

According to a preferred embodiment, the composition may comprise from 0.1 to 2 weight % of moisture scavenger and from 0.5 to 5 weight % of adhesion promoter, relative to the total weight of the hot melt adhesive composition.

The moisture curable silylated adhesive composition according to the invention may also preferably comprise from 0.1% to 2% by weight of at least one antioxidant, relative to the total weight of the hot melt adhesive composition.

The antioxidant useful according to the invention is preferably incorporated in the hot melt adhesive composition to help protect the hot melt adhesive composition from chemical degradations. Said degradations generally involve the reactions of free radicals, resulting from chain scission catalyzed either by ultraviolet light or heat, with dioxygen. Such degradation is usually manifested by a deterioration in the appearance (browning of color) or other physical properties of the adhesive, and in the performance characteristics of the adhesive.

In particular, the antioxidant(s) protects the adhesive from the effect of thermal degradations reactions which mainly occur during the manufacturing and application process of the adhesive where the hot melt adhesive composition and its ingredients are heated for a long time at high temperature in presence of dioxygen.

Useful antioxidant(s) include hindered phenols and sulfur and phosphorus containing phenols. Hindered phenols are well known to those skilled in the art and may be characterized as phenolic compounds which also contain sterically bulky groups in close proximity to the phenolic hydroxyl group thereof. In particular, tertiary butyl groups generally are substituted onto the benzene ring in at least one of the ortho positions relative to the phenolic hydroxyl group.

Representative hindered phenols include:

1,3,5-trimethyl-2,4,6-tris(3-5-di-tert-butyl-4-hydroxybenzyl) benzene;

pentaerythritol tetrakis-3(3,5-di-tert-butyl-4-hydroxyphenyl) propionate;

n-octadecyl-3(3,5-ditert-butyl-4-hydroxyphenyl) propionate;

4,4'-methylenebis(4-methyl-6-tert-butylphenol);

4,4'-thiobis(6-tert-butyl-o-cresol);

2,6-di-tert-butylphenol;

6-(4-hydroxyphenoxy)-2,4-bis(n-octylthio)-1,3,5-triazine;

2,4,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate;

sorbitol hexa-(3,3,5-di-tert-butyl-4-hydroxy-phenyl) propionate;

2,2'-methylene bis(4-methyl-6-tert-butylphenol)phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DS TDP);

tetrakis(methylene(3,5-di-ter-butyl-4-hydroxyhydrocinnamate)) methane;

(tris(2,4-ditert-butylphenyl)phosphate), and combinations thereof.

The hindered phenol antioxidants may be used by themselves or in combination with other antioxidants, such as phosphites antioxidants like IRGAFOS® series, or aromatic amine antioxidants like NAUGARD® series from ADDIVANT.

Useful antioxidants are commercially available under a variety of trade designations including, e.g., the hindered phenolic antioxidants of IRGANOX® series from BASF including, e.g., IRGANOX® 1010 (tetrakis(methylene(3,5-di-ter-butyl-4-hydroxyhydrocinnamate)) methane), and IRGAFOS® 168 antioxidant (tris(2,4-ditert-butylphenyl) phosphate).

The total amount of antioxidant(s) is preferably ranging from 0.1 to 3% by weight, and more preferably from 0.5% to 1% by weight, relative to the total weight of the hot melt adhesive composition.

The moisture curable silylated adhesive composition according to the invention may also preferably comprise at least one curing catalyst, which may be any catalyst known to a person skilled in the art for the condensation of silanol. Mention may be made, as examples of such catalysts, of amines or organometallic derivatives, and in particular organic derivatives of iron, titanium, aluminium, or divalent or tetravalent tin, such as dibutyl tin laurate (DBTL).

Weight amounts of curing catalyst usually lie in the range 0.1 to 2%.

The moisture curable composition according to the invention can be prepared by mixing the silane modified amorphous poly-α-olefin (A), and the filler (B) at a temperature ranging from 120° C. to 180° C. and at a relative humidity ranging from 0.1% to 50%. If a catalyst is present, it is preferably added in a second step, after the silylane modified APAO (A) and the filler (B) have been mixed. The other ingredients are introduced in accordance with the usual practice.

The present invention also relates to the use of the moisture curable silylated adhesive composition according to the invention, as an assembly adhesive or a laminating adhesive, in the transportation and electronics industries, preferably in the automotive industry.

The present invention also relates to a method for manufacturing an assembly product comprising:

a step (i) of heating at a temperature ranging from 130° C. to 180° C. the moisture curable silylated adhesive composition according to the invention, for a period of time long enough to render said composition liquid enough to be applied on a substrate, then a step (ii) of coating said composition on the surface of a primary substrate, then a step (iii) of putting into contact the coated surface of the primary substrate with the surface of a secondary substrate, then a step (iv) of chemically curing the coated composition with water, preferably with atmospheric moisture.

The adhesive composition can be applied to the surface of the primary substrate using any conventional technique, such as slot die coating, roller coating, extrusion coating or spray coating.

The amount of coated adhesive by surface unit of the primary substrate can vary in a very large range from 50 to 500 g/m$^2$, preferably from 65 to 300 g/m$^2$, depending on the substrates intended to be bonded.

The primary and secondary subtrates may be different or of same nature and can be composed of any conventional material including polypropylene, polyethylene, ABS, PMMA and metallic substrates.

According to a more preferred embodiment, at least one of the primary and secondary substrates is aluminium.

The present application relates, at last, to an assembly product comprising at least two substrates bonded by at least one cured silylated adhesive composition according to the invention.

The substrates bonded may be chosen among the substrates listed above for the method according to the invention.

In a particular embodiment of the invention, the assembly product according to the invention may be a multilayer product comprising at least two layers of substrate(s) bonded by at least one cured silylated adhesive composition according to the invention.

The following examples are given purely to illustrate the invention, but should not be interpreted as limiting its scope.

Example 1: Moisture-Curable Silylated Adhesive Composition Based on APAO (A), Filler (B), and Tackifying Agent (C)

1) Preparation:

The composition of example 1 is prepared by mixing the ingredients pointed out in Table 1, as disclosed previously.

After its preparation, the composition is stored into a sealed cartridge, then is submitted to the following test.

2) Failure Test of an Assembly Consisting of 2 Aluminium Plates Joined, on a Bonding Area, by the Cured Composition:

Use is made of 2 aluminium rectangular plates of dimensions 100 mm×25 mm. After cleaning the two plates with ethanol, a rectangular bonding area of dimensions 12.5 mm×25 mm is defined (by means of an adhesive tape) at one end of each plate.

The adhesive composition prepared above is heated at 150° C. for one hour, then applied on the bonding area of a first aluminium plate, which is then quickly overlapped with the bonding area of the second aluminium plate, in order to make a shear specimen, in which the free parts of the 2 aluminum plates extend opposite, from each side of the bonded area.

The thickness of the adhesive composition between the 2 aluminium plates is 2 mm and is controlled by means of a 2 mm spacer.

The shear specimen is placed in an oven at 120° C. for 5 minutes, then in a conditioning room at 23° C./5 0% RH during 7 days for curing.

After curing, the two ends of said shear specimen are pulled in a tensile machine at a constant rate equal to 10 mm/minute, until failure (or rupture) of the specimen is obtained.

The corresponding stress (or breaking stress) is recorded and noted in Table 1.

The bonding area of each plate is observed in order to determine the failure mode. A 50% Cohesive Failure was observed and is noted as 50% CF in Table 1.

Examples 2-4: Moisture-Curable Silylated Adhesive Compositions Based on APAO (A), Filler (B), and Tackifying Agent (C)

Example 1 is repeated with the compositions shown in Table 1. The same test as for example 1 were then implemented. Results are noted in Table 1.

Examples A and B (Comparative): Moisture-Curable Silylated Adhesive Composition Based on APAO (A) and Tackifying Agent (C) without Filler (B)

Example 1 is repeated with the compositions shown in Table 1. The same test as for example 1 were then implemented. Results are noted in Table 1.

Examples 1-4 in Table 1 clearly show, in contrast with Examples A and B, a shear failure mode of at least 50% CF which points towards a significantly improved adhesion on aluminium substrates, together with a suitable cohesion of the adhesive joint consisting of the cured composition.

| Ingredient | | Content in % (weight/weight) | | | | | |
|---|---|---|---|---|---|---|---|
| Name | Structure or Function | Ex. 1 | Ex. 2 | Ex. 3 | Ex. 4 | Ex. A (comp.) | Ex. B (comp.) |
| VESTOPLAST ® 206 | Silane modified APAO (A) | 35.5 | 34.0 | 34.0 | 35.8 | 36.8 | 38.6 |
| EMC Organic-inorganic hybrid filler | Expanded hollow microspheres (B) | 3.5 | 7.6 | 7.6 | 7.2 | 0.0 | 0.0 |
| KOLON HRR ®-100 | Tackifying agent (C) | 31.1 | 29.7 | 21.2 | 31.3 | 32.2 | 33.8 |
| KRATON ® G1643V | Thermoplastic polymer (D) | 8.9 | 8.5 | 8.5 | 9.0 | 9.2 | 9.6 |
| Licocene ® PP SI 1362 | Silane functionalized polyolefin wax (E). | 8.9 | 8.5 | 17.0 | 9.0 | 9.2 | 9.6 |
| Epoxidized linseed oil | Plasticizer (F) | 8.9 | 8.5 | 8.5 | 4.5 | 9.2 | 4.8 |
| Dynasylan ® 7163 | Moisture scavenger and adhesion promoter | 2.2 | 2.2 | 2.1 | 2.1 | 2.3 | 2.4 |
| IRGANOX ® 1010 | Antioxidant | 0.5 | 0.5 | 0.5 | 0.5 | 0.6 | 0.6 |
| DBTL | Curing catalyst | 0.5 | 0.5 | 0.5 | 0.5 | 0.6 | 0.6 |
| Failure test | Breaking stress (MPa) | 0.52 | 1.0 | 0.98 | 1.3 | 0.4 | 0.87 |
| | Failure mode | 50% CF | 100% CF | 100% CF | 100% CF | 100% AF | 25% CF |

The invention claimed is:

1. Moisture curable silylated adhesive composition comprising, based on the total weight of said composition:

from 20% to 50% weight of a silane modified amorphous poly-α-olefin (or APAO) (A);

from 2% to 15% weight of a filler (B) consisting of expanded hollow thermoplastic polymer microspheres;

from 10% to 60% weight of a tackifying agent (C), and an additional thermoplastic polymer (D) which does not contain any alkoxysilyl group and is selected from the group consisting of styrene block copolymers (SBC).

2. Moisture curable silylated adhesive composition according to claim 1, characterized in that the silane modified amorphous poly-α-olefin (A) comprises at least one alkoxysilyl group of formula (I):

$$—Si(R^1)_p(OR^2)_{3-p} \quad (I)$$

in which:

$R^1$ represents a linear or branched alkyl radical comprising from 1 to 4 carbon atoms, wherein when there is more than one radical $R^1$, these radicals are identical or different;

$R^2$ represents a linear or branched alkyl radical comprising from 1 to 4 carbon atoms, wherein when there is more than one radical $R^2$, these radicals are identical or different, and wherein when two $OR^2$ groups are present, these $OR^2$ groups are optionally engaged in a single ring;

p is an integer equal to 0, 1 or 2.

3. Moisture curable silylated adhesive composition according to claim 1, characterized in that the filler (B) consists of expanded hollow thermoplastic polymer microspheres coated with a colloidal calcium carbonate.

4. Moisture curable silylated adhesive composition according to claim 1, characterized in that the tackifying agent (C) is selected from the group consisting of silanized derivatives of C5 resins, silanized derivatives of C9 resins and silanized derivatives of mixtures of C5/C9 resins, wherein the C5 resins are aliphatic, including cycloaliphatic, petroleum hydrocarbon resins (C5) having a Ring and Ball softening point of from about 60° C. to 140° C.; the C9 resins are aromatic petroleum hydrocarbon resins (C9) having Ring and Ball softening point of from about 60° C. to 140° C.; and the C5/C9 resins are aliphatic, including cycloaliphatic, and/or aromatic petroleum resins (C5/C9) having a Ring and Ball softening point of from about 60° C. to 140° C.

5. Moisture curable silylated adhesive composition according to claim 1, characterized in that a softening point of the tackifying agent (C) lies in the range from 90° C. to 115° C.

6. Moisture curable silylated adhesive composition according to claim 1, characterized in that it comprises, based on the total weight of said composition:

from 30% to 40% weight of the silane modified APAO (A);

from 3% to 10% weight of the filler (B); and from 20% to 40% weight of the tackifying agent (C).

7. Moisture curable silylated adhesive composition according to claim 1, characterized in that the additional thermoplastic polymer (D) is a linear SEBS triblock copolymer.

8. Moisture curable silylated adhesive composition according to claim 1, characterized in that the moisture curable silylated adhesive composition comprises at least one silane functionalized polyolefin wax (E).

9. Moisture curable silylated adhesive composition according to claim 1, characterized in that the moisture curable silylated adhesive composition comprises at least one plasticizer (F) which is selected from the group consisting of a naphthenic oil, a paraffinic oil, a vegetable oil, polyisobutylene, a benzoate ester, a non silane functionalized wax and an acrylic or carboxylic acid modified wax.

10. An assembly adhesive or a laminating adhesive comprising the moisture curable silylated adhesive composition of claim 1.

11. Method for manufacturing an assembly product comprising:

a step (i) of heating at a temperature ranging from 130° C. to 180° C. the moisture curable silylated adhesive composition of claim 1, for a period of time long enough to render said composition liquid enough to be applied on a substrate, then a step (ii) of coating said composition on a surface of a primary substrate, then a step (iii) of putting into contact the coated surface of the primary substrate with a surface of a secondary substrate, then a step (iv) of chemically curing the composition with water.

12. Method for manufacturing an assembly product according to claim 11, characterized in that at least one of the primary and secondary substrates is aluminium.

13. Assembly product comprising at least two substrates bonded by at least one cured silylated adhesive composition as defined in claim 1.

* * * * *